(No Model.) 7 Sheets—Sheet 4.

C. E. LIPE.
BORING AND FACING MACHINE.

No. 555,013. Patented Feb. 18, 1896.

WITNESSES:
R. E. Tomlinson
Jessie E. Murray

INVENTOR
C. E. Lipe
By Smith & Denison
ATTORNEYS.

(No Model.) 7 Sheets—Sheet 5.
C. E. LIPE.
BORING AND FACING MACHINE.

No. 555,013. Patented Feb. 18, 1896.

WITNESSES: INVENTOR
C. E. Lipe (No Model.) 7 Sheets—Sheet 6.
C. E. LIPE.
BORING AND FACING MACHINE.
No. 555,013. Patented Feb. 18, 1896.
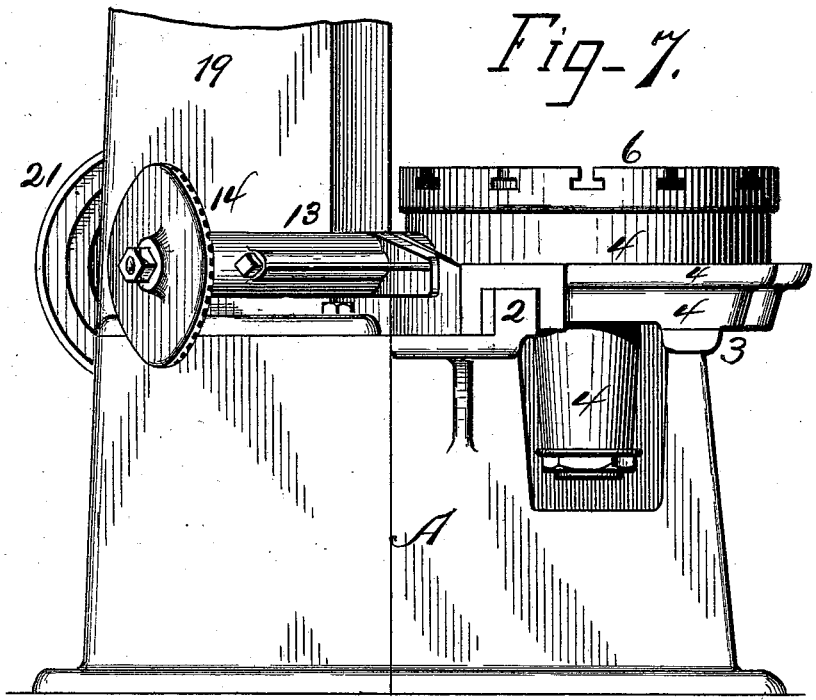
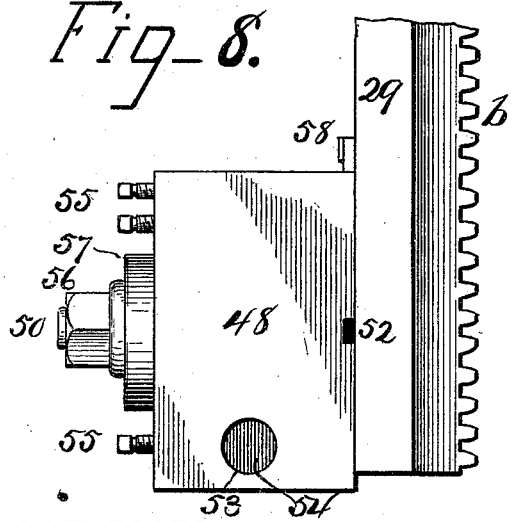
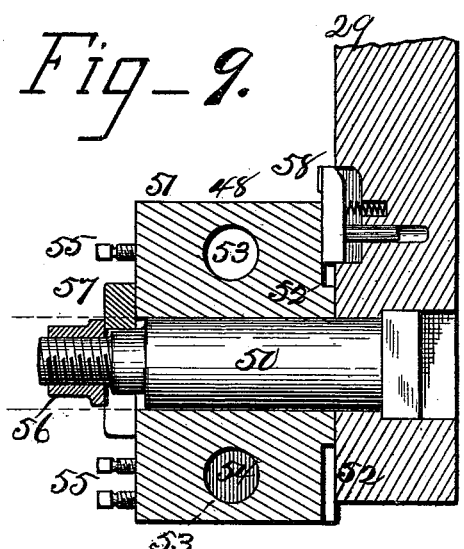
WITNESSES:
INVENTOR
C. E. Lipe
By Smith & Denison
ATTORNEYS.

(No Model.) 7 Sheets—Sheet 7.
C. E. LIPE.
BORING AND FACING MACHINE.
No. 555,013. Patented Feb. 18, 1896.
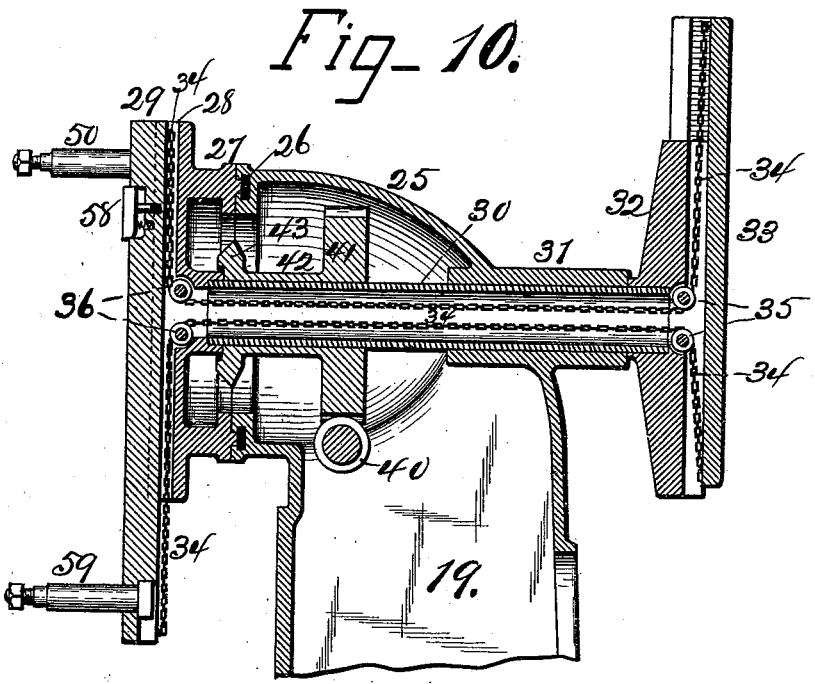
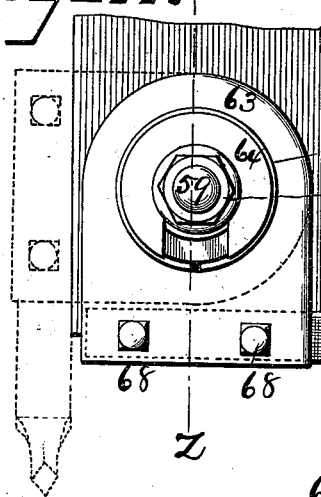
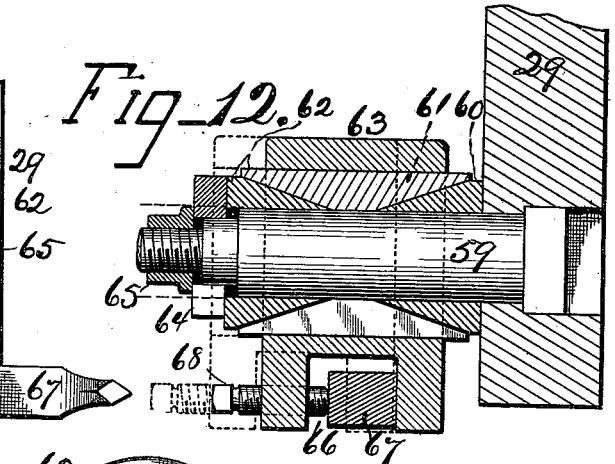
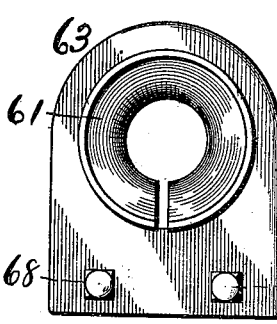
WITNESSES:
C. E. Tomlinson
Jessie E. Murray
INVENTOR
C. E. Lipe
by
Smith & Denison
ATTORNEYS.

United States Patent Office.

CHARLES E. LIPE, OF SYRACUSE, NEW YORK; MARY L. LIPE ADMINISTRATRIX OF SAID CHARLES E. LIPE, DECEASED.

BORING AND FACING MACHINE.

SPECIFICATION forming part of Letters Patent No. 555,013, dated February 18, 1896.

Application filed December 14, 1894. Serial No. 531,811. (No model.)

*To all whom it may concern:*

Be it known that I, CHARLES E. LIPE, of Syracuse, in the county of Onondaga, in the State of New York, have invented new and useful Improvements in Boring and Facing Machines, of which the following, taken in connection with the accompanying drawings, is a full, clear, and exact description.

My invention relates to boring and facing machines in which the work is secured upon a rotating table and the tool is mounted in a suitably reciprocated and fed tool-carrier or ram, but does not rotate.

My object is to produce a boring and facing machine in which a non-rotating laterally or vertically fed tool bores or finishes the work which is secured upon a rotating table, and in the case of a pulley the hub is bored out by a vertically-fed and non-rotating tool, the ends of the hub and edges of the rim are faced by laterally feeding the work and using a non-rotating tool, and the face of the pulley is turned off by a vertically-fed and non-rotating tool, the pulley being horizontal and the work-table being adapted to be both laterally fed and rotated simultaneously or rotated without the lateral feed, whereby the machine is not top-heavy, substantially all of the danger of tool-chattering is removed and the work done is smoother and more true than is done in machines where the work is stationary and the tool is fed laterally or vertically for facing or rotated for boring.

My invention consists in the several novel features of construction and operation hereinafter described, and which are specifically set forth in the claims hereunto annexed.

It is constructed as follows, reference being had to the accompanying drawings, in which—

Figure 1:
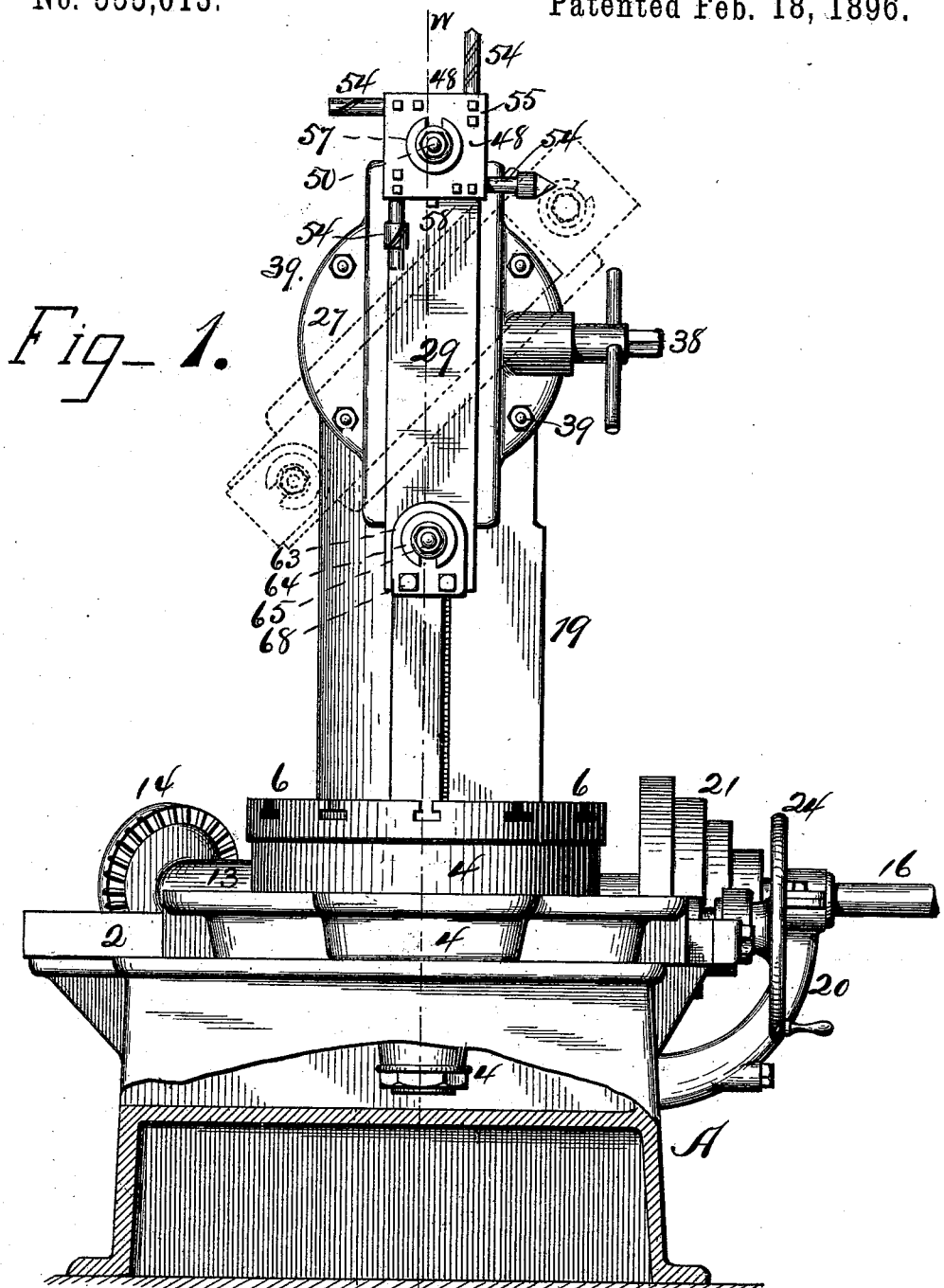
Figure 2:
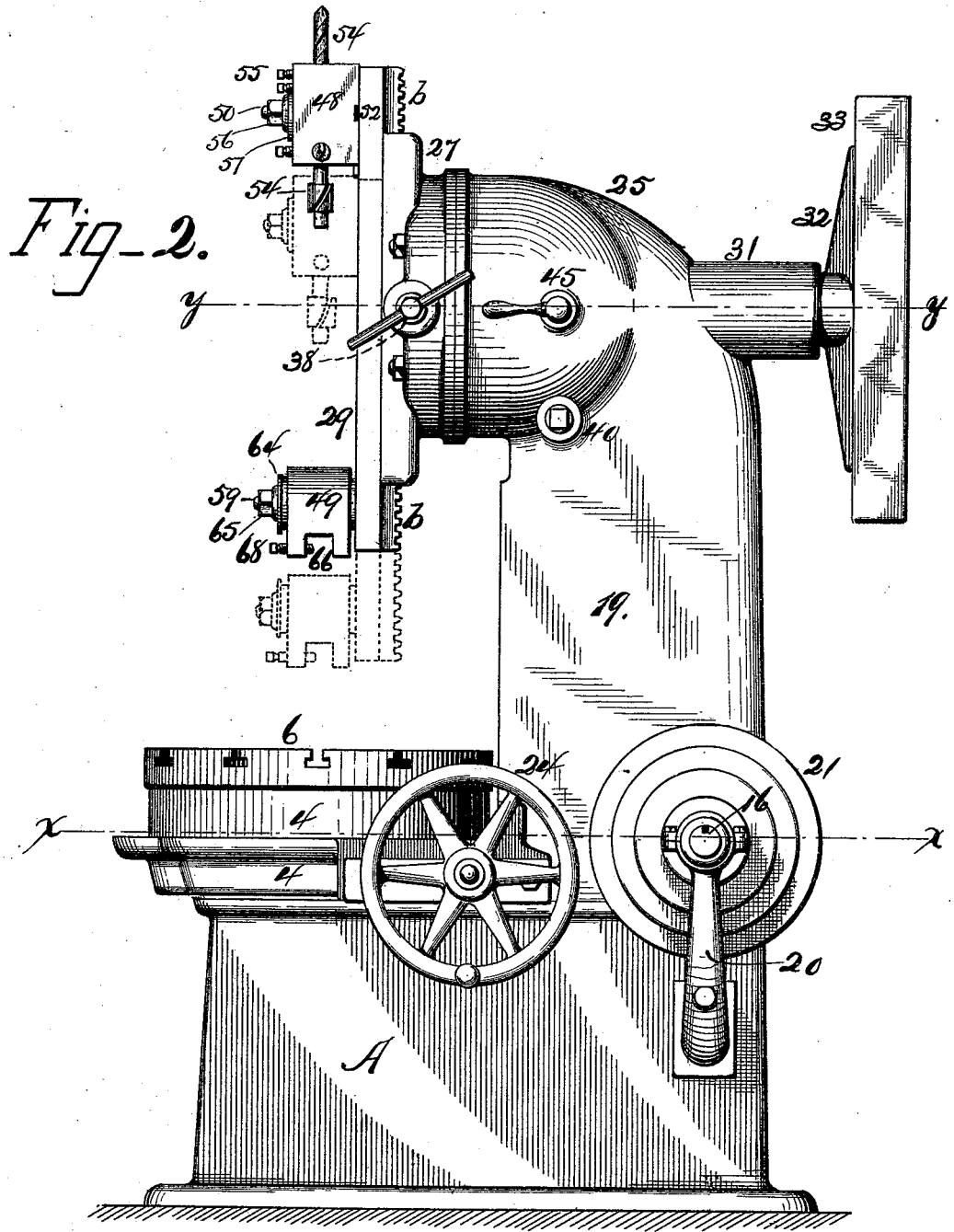
Figure 3:
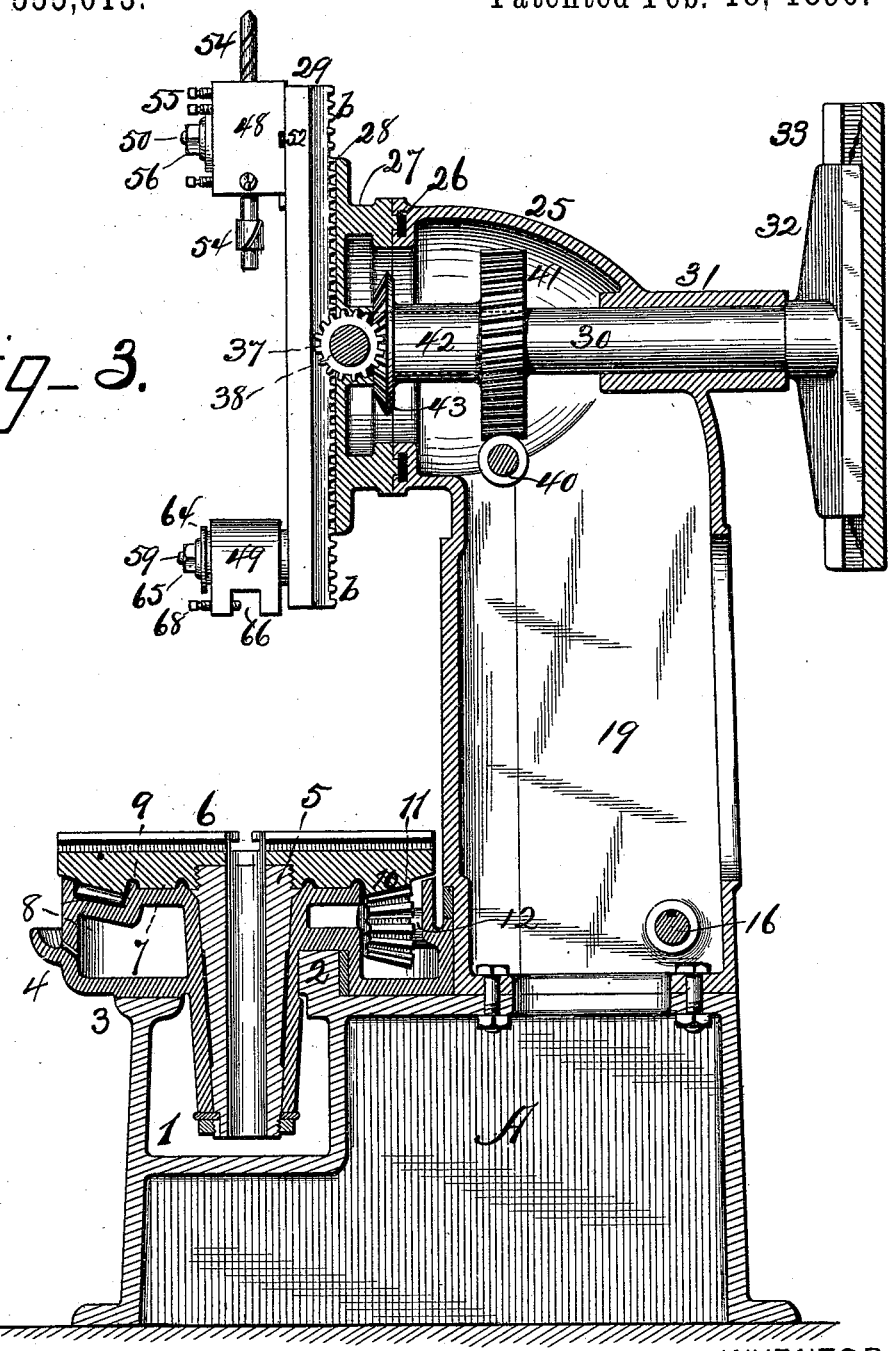
Figure 4:
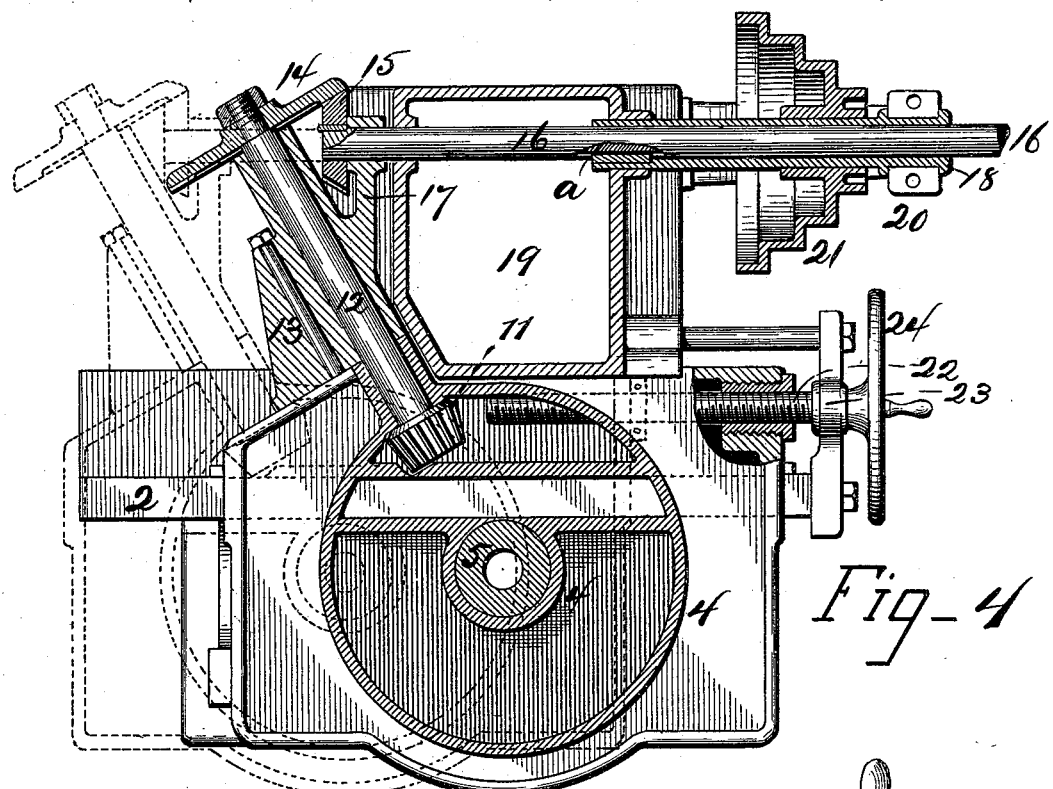
Figure 6:
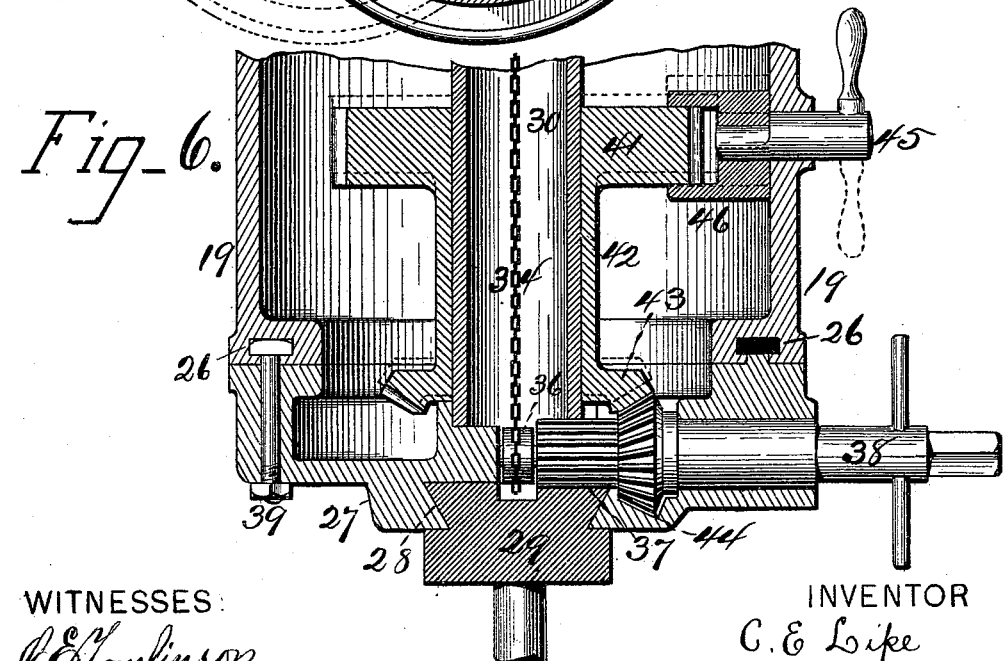
Figure 5:
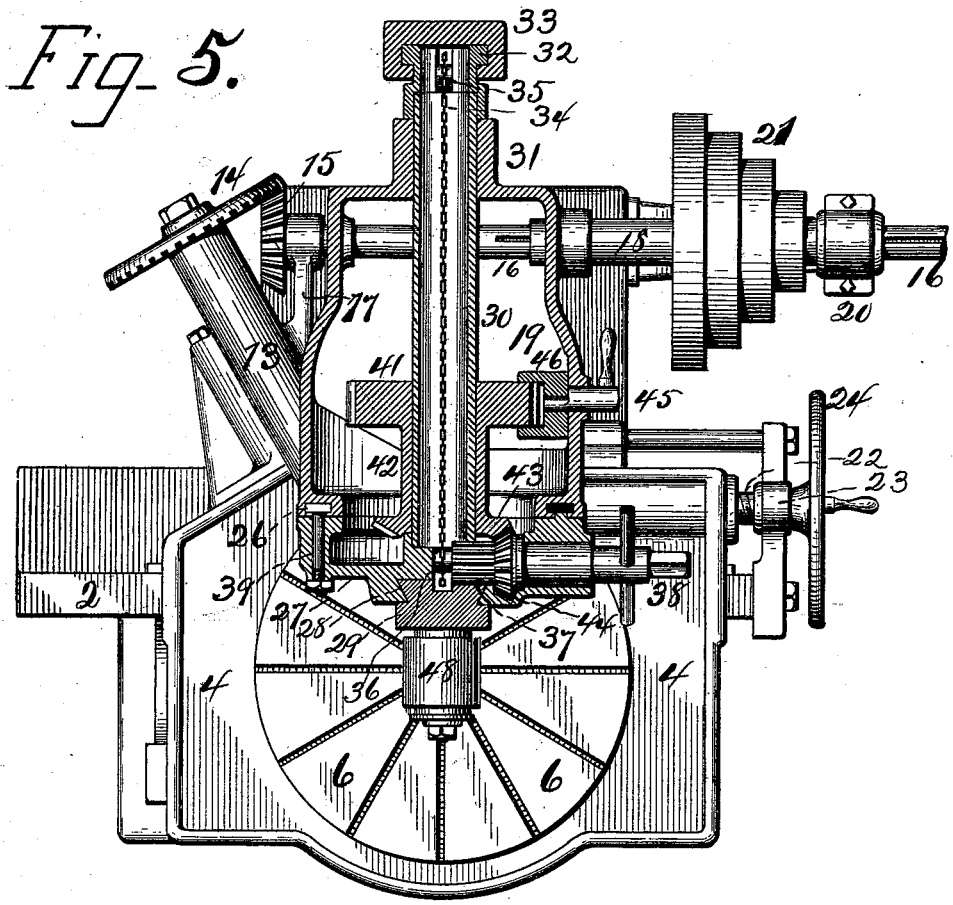

Figure 1 is a front elevation of the machine with the base partly broken out. Fig. 2 is a side elevation thereof, the dotted lines indicating the vertical feed of the tool-carrier. Fig. 3 is a vertical sectional elevation on line $w\ w$, Fig. 1. Fig. 4 is a transverse section on line $x\ x$ in Fig. 2. Fig. 5 is a like view on line $y\ y$ in Fig. 2. Fig. 6 is an enlarged sectional detail on line $y\ y$ in Fig. 2. Fig. 7 is a side elevation of the base and work-table, looking at the opposite side of Fig. 2. Fig. 8 is a side elevation of part of the tool-carrying ram and the tool-turret. Fig. 9 is a vertical sectional elevation of the same, showing the connection of said turret to said ram and its mounting thereon. Fig. 10 is a vertical section of the upper part of the standard, the counterbalance, the ram and the connection between them through the hollow shaft, the feed mechanism for reciprocating the ram and omitting the tool-turret and tool-holder. Fig. 11 is a front elevation of part of the tool-holder and ram. Fig. 12 is a vertical sectional elevation of the same on line $z\ z$ in Fig. 11. Fig. 13 is a front elevation of the tool-holder and expansible sleeve therein, omitting the shaft and wedges.

Referring to Figs. 1 and 3, A is the base provided with a transverse recess 1, open on top and having a transverse guide 2 and ways 3, and 4 is the bed mounted upon said guide and ways and recessed centrally to receive the tubular shank 5 of the work-table 6, which has a circular flat bearing 7 upon the bed, and 8 is an oil or soda catching reservoir in the bed, and 9 are oil-retaining walls; and said table is also provided with a circular and beveled gear 10 with which the drive-pinion 11 engages to rotate said table. Said table is provided with radial T-shaped grooves or with any other ordinary means whereby the work can be secured thereon. Said pinion is secured upon a shaft 12, (see Fig. 4,) which is journaled in an arm or offset 13 secured to said bed and is provided with a bevel-gear 14, driven by the bevel-pinion 15, which is secured upon the shaft 16, journaled in the arm 17 upon the offset 13, and is connected to the sleeve 18 by an ordinary gib or spline and feather-way connection $a$, so as to be reciprocated longitudinally therein when the bed is fed laterally and so as to be rotated when said sleeve is driven, said sleeve being journaled in the standard 19 and in the bracket 20 and driven by the pulley 21, secured upon said sleeve.

A feed-screw 22 is journaled in a bearing 23 erected upon the base and engaging with the bed and is rotated to feed the bed laterally by means of the hand-wheel 24 or by any other means desired; and as the shaft 12 is journaled in said bed, and as the arm 17 is connected to said bed, and as the shaft 16 is adapted to traverse the sleeve while being rotated thereby, so that when the bed is fed laterally (see dotted lines, Fig. 4) the table is still rotated by said shafts and gearing.

The standard 19 is erected upon the base in any ordinary manner and is stationary thereon and is provided with an angular extension 25, Figs. 2 and 3, and the outer end is provided with a T-shaped way 26, which receives the heads of the bolts by which a head 27 is mounted upon the standard. Upon the outer face of this head parallel guides 28 are provided in which the ram (or tool-carrier) 29 is mounted and adapted to slide or be reciprocated. A tubular shaft 30 is journaled in said standard at 31 and secured to said head 27 and upon its rear end is provided with a transverse guide 32 on which the counterbalance 33 is mounted and adapted to be reciprocated. As shown in Fig. 10, a chain or chains 34 is connected to one or both of the extremities of said counterbalance interiorly, thence passes over idlers 35 in the guide 32, thence through the shaft 30 and over the idlers 36 in said head and thence extends outwardly and is connected to one or both the extremities of the ram, whereby, as said ram is shifted or fed in one direction, so said counterbalance is shifted in the opposite direction.

A rack $b$ is cut upon the back of the ram and a pinion 37 engages therewith, being mounted upon a shaft 38, Fig. 5, journaled in the head and provided with means whereby it may be rotated to reciprocate the ram. To rotate the head 27 so as to reverse the ram, the bolts 39 are loosened and the head turned by hand or the worm-shaft 40 journaled in the standard is rotated, which rotates the worm-gear 41 and the sleeve 42 upon which it is secured, said sleeve fitting loosely over the shaft 30, and this rotates the bevel-gear 43, Fig. 6, which is shown as in mesh with the bevel-pinion 44 upon the shaft 38. When so shifted the partial rotation of the shifting eccentric 45 which engages with the block 46, which in turn engages with the worm-gear 41, substantially as shown in Fig. 6, slides said worm-gear, sleeve and bevel-gear upon the shaft 30 and throws said bevel-gear out of its engagement with said bevel-pinion, leaving the ram free to be fed rapidly by means of the shaft 38 and pinion 37, or shaft 40 and gears 41, 43, and 44. The tightening of the bolts secures the head and ram so shifted. In Figs. 1, 2, and 3 the turret 48 and tool-post 49 are shown upon said ram. The turret is used for mounting tools of different kinds having round shanks—as drills, reamers, &c.—for boring or finishing bored holes, and consists of a pivot 50 mounted in the ram, a body 51 pivoted thereon and provided with grooves 52 in the back, usually one for each tool, tool-sockets 53 receiving the shanks of the tools 54, bolts 55 to secure said tools in their sockets, a nut 56 upon the pivot, and a radially-grooved collar 57 between said nut and the turret-body and bearing thereon, so that by loosening said nut said turret can be rotated upon its pivot to change from one tool to another, or by lifting out said collar said turret-body can be removed from its pivot without taking off said nut. To hold said turret from being accidentally shifted at any time, as when said nut is being tightened, and to set each tool in alignment with the ram, a spring-dog 58, of substantially the form shown in Fig. 9, is mounted in said ram adapted to engage with each of said grooves 52 as the turret is rotated and is disengaged therefrom by pushing said pawl back by hand. Said dog also aids in preventing the turret from turning upon said pivot when the ram is fed downward, on account of the tools being mounted in said turret on one side of the center thereof, and the strain thus brought upon the turret.

In Figs. 11, 12, and 13 the tool post or holder is shown designed to hold tools having polygonal shanks and designed to be used as planing or turning tools for facing or finishing flat, curved, or vertical surfaces. A pivot 59 is mounted in the ram, a tubular wedge 60 is mounted on said pivot, a split sleeve 61 tapered inwardly from the ends is placed upon the pivot, and 62 is another tubular wedge upon said pivot, 63 is the case or body inclosing said sleeve, 64 is a collar like unto 57, and 65 is the fastening-nut, by which all parts are bound together upon the pivot.

Recesses 66 are provided upon the sides of the body to receive the shanks of the tools. 67 and 68 are set-screws for securing the tools therein. By loosening the nut and removing the collar the body, sleeve, and outer wedge can be readily removed from the pivot without removing said nut.

It will be readily seen that for boring the turret-tool is stationary while the work rotates upon a center in alignment with the center of the boring-tool, so that in case of a pulley the hub can be bored centrally, and then by shifting the work a hole can be bored in a spoke to receive a crank-pin, and that in both cases the work rotates while the tool is stationary, except as to its feed, and that by shifting the ram the other tools can be used for facing the then horizontal ends of the hub and the edges of the rim, the work rotating and the table being fed laterally, and any vertical, inclined, or curved surface, as the inner or outer faces of the pulley-rim, can be faced by feeding the tool down and rotating the work, and that all flat surfaces are finished from the center outwardly or from the outside inwardly.

It will be further seen that the head can be readily shifted to set the ram at any angle in order to turn tapers and for many other analogous purposes; also that in any position the ram can be fed by rotating the shaft 40, gear 41, sleeve 42, and bevel-gear 43, and that the work-table is fed for facing by the rotation of the screw 22, and that the counterweight balances the ram in all positions or projections thereof.

Having described my invention, what I claim, and desire to secure by Letters Patent, is—

1. In a boring and facing machine, the combination with the standard of a reciprocatory reversible ram mounted thereon, and a counterbalance connected to said ram and adapted to be rotated by the rotation of the ram.

2. In a boring and facing machine, the combination with the standard of a head, mounted and adapted to be rotated thereon, a ram mounted and adapted to be reciprocated upon said head, and a counterbalance connected to said head and to said ram and adapted to be rotated with said head and reciprocated when said ram is reciprocated.

3. In a boring and facing machine, the combination with the base, a bed mounted and adapted to be reciprocated laterally thereon, and a table mounted and adapted to be rotated upon said bed, and means to reciprocate said bed and rotate said table, simultaneously, of a standard, a head rotatable therein, a reciprocated reversible ram mounted thereon, and a counterbalance connected to said ram and adapted to be rotated by the rotation of the ram.

4. In a boring and facing machine a suitable standard, a shaft journaled therein, a head rotatably mounted upon said standard, a ram mounted in ways across said head and provided with a rack, and a turret or tool-post rotatably mounted upon said ram, in combination with a guide upon the rear end of said shaft provided with suitable ways, a counterbalance mounted in said ways and means to connect it to said ram whereby it rotates when said ram and head are rotated.

5. In a boring and facing machine a suitable standard, a shaft journaled therein, a head rotatably mounted upon said standard, a ram mounted in ways across said head and provided with a rack, and a turret or tool-post rotatably mounted upon said ram, in combination with a guide upon the rear end of said shaft provided with suitable ways, a counterbalance mounted in said ways and means to connect it to said ram whereby it rotates when said ram and head are rotated, and is reciprocated upon its guide when the ram is shifted upon said head.

6. In a boring and facing machine, a tool-slide guide and counterweight-guide, respectively, secured to the opposite ends of a shaft mounted on the supporting-column of the machine, thereby causing both tool-slide and counterweight-guide to reciprocate in parallel paths in all working positions.

In witness whereof I have hereunto set my hand on this 30th day of November, 1894.

C. E. LIPE.

In presence of—
JESSIE E. MURRAY,
HOWARD P. DENISON.